(12) United States Patent
Sasanuma (10) Patent No.: US 6,293,607 B1
(45) Date of Patent: Sep. 25, 2001

(54) LIGHT SHIELDING APPARATUS FOR REAR WINDOW OF AUTOMOBILE

(76) Inventor: Saburo Sasanuma, 3-15-26, Shimoda-cho, Kohoku-ku, Yokohama-shi, Kanagawa 223-0064 (JP)

( * ) Notice: Subject to any disclaimer, the term of this patent is extended or adjusted under 35 U.S.C. 154(b) by 0 days.

(21) Appl. No.: 09/631,832

(22) Filed: Aug. 3, 2000

(30) Foreign Application Priority Data

Aug. 6, 1999 (JP) ................................................. 11-224301

(51) Int. Cl.[7] .................................................... B62B 5/00
(52) U.S. Cl. ...................... 296/97.4; 296/97.8; 296/97.11
(58) Field of Search ................................. 296/97.4, 97.8, 296/97.1, 97.11, 97.12; 160/DIG. 2, DIG. 3

(56) References Cited

U.S. PATENT DOCUMENTS 4,848,827 * 7/1989 Ou ................................... 296/97.1 X
5,418,644 * 5/1995 Tsai ...................................... 296/97.4

FOREIGN PATENT DOCUMENTS

2173752-A * 10/1986 (GB) ................................... 296/97.4

* cited by examiner

*Primary Examiner*—Stephen T. Gordon
*Assistant Examiner*—Jason Morrow
(74) *Attorney, Agent, or Firm*—Nath & Associates PLLC; Gary M. Nath; Marvin C. Berkowitz (57) ABSTRACT

A light shielding apparatus for a rear window of an automobile which covers an inside of the rear window of the automobile so as to shield a rear side from a light, includes: a main light shielding material for shielding a center section of the rear window from a light; right and left sub light shielding materials for shielding right and left curved face sections of the rear window from a light; and a light shielding material moving mechanism for moving the main light shielding material and the sub light shielding materials to a light shielded state or a stored state.

5 Claims, 6 Drawing Sheets

FIG.5

LIGHT SHIELDING APPARATUS FOR REAR WINDOW OF AUTOMOBILE

BACKGROUND OF THE INVENTION

1. Field of the Invention

The present invention relates to a light shielding apparatus for windows of an automobile which is capable of shielding a light only as the need arises, especially to a light shielding apparatus for a rear window of an automobile.

2. Description of the Related Art

Conventionally, as a light shielding apparatus for a rear window which shields a light coming through a rear window of an automobile, there exists a light shielding apparatus in which a light shielding curtain is attached to the rear window by means of an adhesion pad. The light shielding curtain is spread manually and is stored by folding it when a light is let come through the rear window.

In another ones, in the case where a winding-type light shielding curtain is provided above a rear seat so as to shield a light or where a light shielding curtain is provided in a tray behind a rear seat so as to be pulled upwardly, the light shielding curtain is pulled down or pulled up and is fastened with a hook, or a light shielding material is slid to be pulled out of a rear side of the roof. A blind-type light shielding material is provided, or a curtain, which is opened and closed along rails provided above and below the rear window, is provided. Moreover, a rear window is made of light shielding glass, or a light shielding film is stuck to a rear window so as to shield an outer light semipermanently.

However, in such conventional arts, a light shielding curtain is attached in order to prevent a temperature in an automobile from rising due to a strong outer light in summer, and when the curtain is not necessary in winter, evening, night or the like, the curtain should be opened or removed. This is troublesome and is not preferable for the appearance of the automobile. In addition, the light shielding curtain according to such conventional arts hardly blind or cover full face of the rear window.

Further, in the case where a light shielding film or light shielding glass is used, a rear visibility becomes always narrow, and this is not preferable for driving.

SUMMARY OF THE INVENTION

The present invention has been achieved in order to solve the above problems.

It is an object of the present invention to provide a light shielding apparatus for a rear window of an automobile which is capable of automatically shielding a rear window from a light only as the need arises and of being post-attached at low price.

It is another object of the present invention to provide a light shielding apparatus for a rear window of an automobile which is capable of automatically shielding a full face of a rear window from a light in such a manner that a light shielding curtain of the light shielding apparatus is almost contacted to the rear window.

In order to achieve the above object, a first aspect of the invention provides a light shielding apparatus for a rear window of an automobile which covers an inside of the rear window of the automobile so as to shield a rear side from a light, including: a main light shielding material for shielding a center section of the rear window from a light; right and left sub light shielding materials for shielding right and left curved face sections of the rear window from a light; and a light shielding material moving mechanism for moving the main light shielding material and the sub light shielding materials to a light shielded state or a stored state.

Therefore, in the case where the rear window is shielded from a light, the light shielding material moving mechanism moves the main light shielding material rear so as to shield the center section of the rear window from a light. The two sub light shielding materials shield the right and left curved face sections of the rear window from a light.

In other words, in the light shielding apparatus for a rear window of an automobile from the first aspect, in the case where the rear window is shielded from a light, the light shielding material moving mechanism moves the main light shielding material rear so as to shield the center section of the rear window from a light. Moreover, two light shielding materials shield the right and left curved face sections of the rear window from a light. As a result, the whole face of the rear window can be shielded from a light securely.

A second aspect of the invention provides the light shielding apparatus for the rear window of the automobile according to the first aspect, wherein: the main light shielding material is composed of a plurality of approximately rectangular-shaped flexible materials including plates or curtains at least one of which has a light shielding function; the sub light shielding materials are composed of a plurality of plates or curtains at least one of which has a light shielding function; and each of the sub light shielding materials includes: a light shielding portion which can be curved for shielding the rear window from a light and is inserted into the main light shielding materials; and an arm sections which supports the light shielding portion and is bent at predetermined angle.

Therefore, the main light shielding material is composed of the two or more approximately rectangular-shaped flexible materials, and at least one of them is the plate or curtain having the light shielding function. Moreover, the sub light shielding materials are composed of a plurality of plates or curtains at least one of which has the light shielding function. The light shielding portions which can be curved are supported by the bent arm sections and are stored between the main light shielding materials.

More specifically, in the light shielding apparatus for the rear window of the automobile from the second aspect, the main light shielding material is composed of two or more approximately rectangular-shaped flexible materials, and at least one of them is the plate or curtain having the light shielding function and shields a light. Moreover, at least one of the sub light shielding materials is the plate or curtain having the light shielding function and shields a light. The light shielding portions of the sub light shielding materials which can be curved are supported by the bent arm sections, and are sandwiched between the main light shielding materials. As a result, the center main light shielding material and the right and left sub light shielding materials can shield a light as one unit.

A third aspect of the invention provides the light shielding apparatus for the rear window of the automobile according to the first or second aspect, wherein: the light shielding material moving mechanism includes a drive motor and a linear moving mechanism which integrally move the plural main light shielding materials to a front-and-rear direction; and the light shielding material moving mechanism further includes a swivel moving mechanism which swivels and moves the light shielding portions of the sub light shielding materials to a light shielded position and to a storage position.

Therefore, the drive motor and the linear moving mechanism integrally move the plural main light shielding materials to the front-and-rear direction so as to locate them in the light shielded position or in the storage position. Moreover, the swivel moving mechanism swivels the sub light shielding materials so as to locate them in the light shielded position or in the storage position.

In other words, in the light shielding apparatus for the rear window of the automobile from the third aspect of the invention, the drive motor and the linear moving mechanism integrally move the plural main light shielding materials to the front-and-rear direction so as to locate them in the light shielded position or in the storage position. Moreover, the swivel moving mechanism swivels the sub light shielding materials so as to locate them in the light shielded position or in the storage position. As a result, in the case where the rear window is not shielded from a light, the light shielding materials can be stored so as not to become obstacles.

A fourth aspect of the invention provides the light shielding apparatus for the rear window of the automobile according to the one aspect among the first aspect to the third aspect, wherein: the swivel moving mechanism moves end points of the arm sections of the sub light shielding materials along guide members provided to the main light shielding material according to the front and rear movement of the main light shielding material, thereby the light shielding portions of the sub light shielding materials are swiveled about fulcrums provided to bent sections of the arm sections of the sub light shielding materials.

Therefore, in the swivel moving mechanism, the points of the arm sections of the sub light shielding materials move to the front-and-rear direction along the guide members provided to the main light shielding material according to the front and rear movement of the main light shielding material. As a result, the sub light shielding materials swivel about the fulcrums provided to the bent sections of the arm sections.

In addition, in the light shielding apparatus for the rear window of the automobile from the fourth aspect of the invention, in the swivel moving mechanism, the points of the arm sections of the sub light shielding materials move to the front-and-rear direction along the guide members provided to the main light shielding material according to the front and rear movement of the main light shielding material. As a result, the sub light shielding materials swivel about the fulcrums provided to the bent sections of the arm sections. As a result, the sub light shielding materials can be taken in/out with the inexpensive and compact mechanism.

A fifth aspect of the invention provides the light shielding apparatus for the rear window of the automobile according to the one aspect among the first aspect to the fourth aspect, wherein the linear moving mechanism includes: slide rails which guide the main light shielding material so as to be movable to the front-and-rear direction; and attachment shafts which can be post-attached to an assist grip or a hanger hook previously mounted into the automobile, the attachment shafts are respectively provided with the slide rails at both ends of the attachment shafts.

Therefore, in the linear moving mechanism, the main light shielding material is supported by the slide rails so as to be movable to the front-and-rear direction, and the slide rails are attached to the hanger hook in the automobile by the attachment shafts. The attachment shafts can be post-attached to the assist grip or the hanger hook.

In other words, in the light shielding apparatus for the rear window of the automobile from the fifth aspect, in the linear moving mechanism, the main light shielding material is supported by the slide rails so as to be movable to the front-and-rear direction, and the slide rails are attached to the assist grip or the hanger hook in the automobile by the attachment shafts. As a result, the slide rails can be attached easily. Moreover, the attachment shafts can be post-attached to the assist grip or the hanger hook. As a result, the attachment shafts can be easily attached to the automobile which has already been purchased.

A sixth aspect of the invention provides the light shielding apparatus for the rear window of the automobile according to the one aspect among the first aspect to the fifth aspect, further including elastic fixing shafts which support the main light shielding material from its lower side in order to make the main light shielding material come closely into contact with the rear window at the time of the light shielding.

Therefore, the flexible main light shielding material is supported by the elastic fixing shafts so as to be made to come closely into contact with the rear window.

More specifically, in the light shielding apparatus for the rear window of the automobile from the sixth aspect, the flexible main light shielding material is supported by the elastic fixing shafts, and the main light shielding material is made to come closely into contact with the rear window. As a result, the rear window can be shielded from a light securely.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

There will be detailed below the preferred embodiments of the present invention with reference to the accompanying drawings. Like members are designated by like reference characters.

Figure 1:
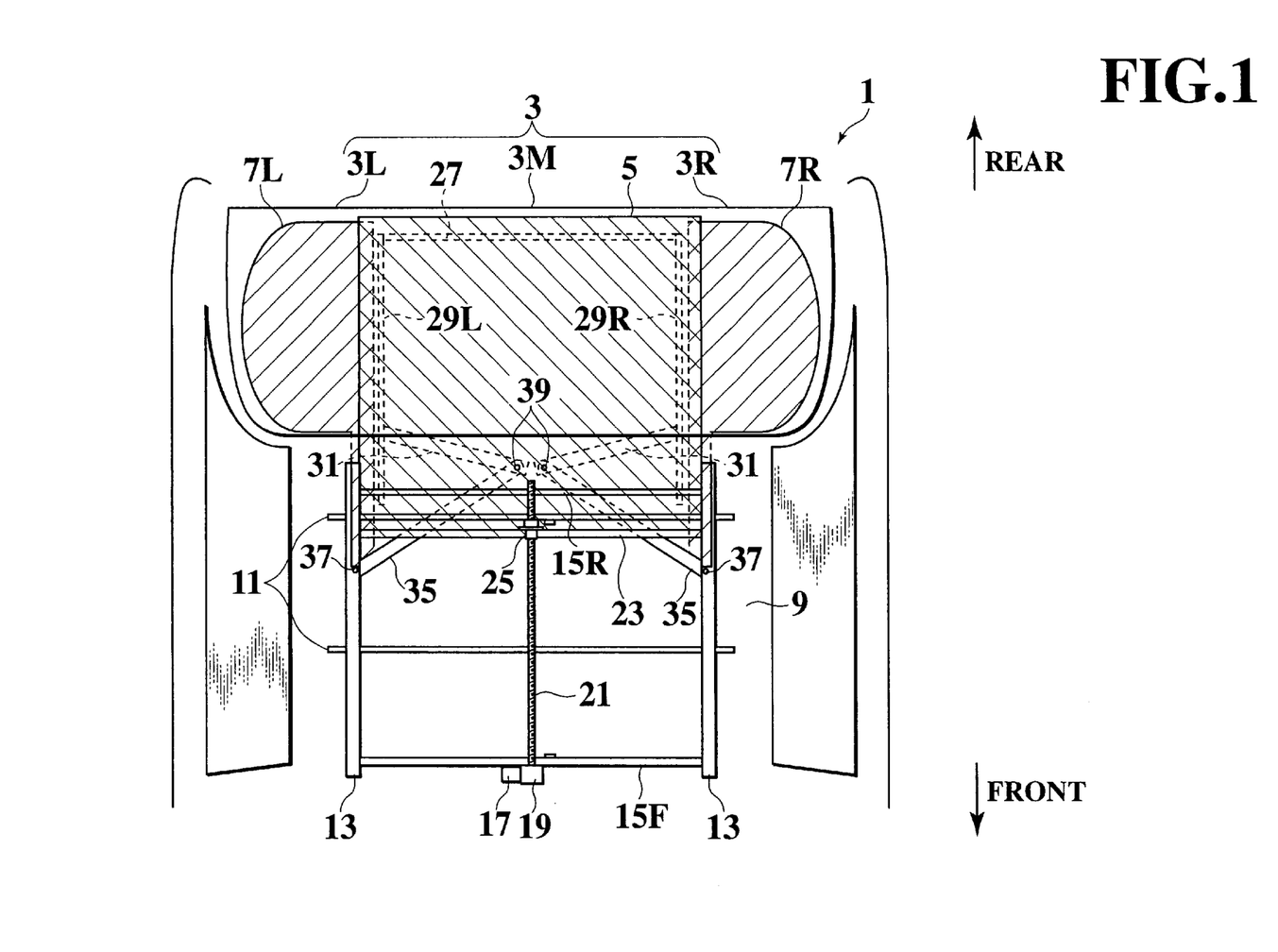
FIG. 1 is an explanatory diagram showing a light shielding apparatus for a rear window of an automobile according to one embodiment of the present invention in a state that a rear window is shielded from a light.
Figure 2:
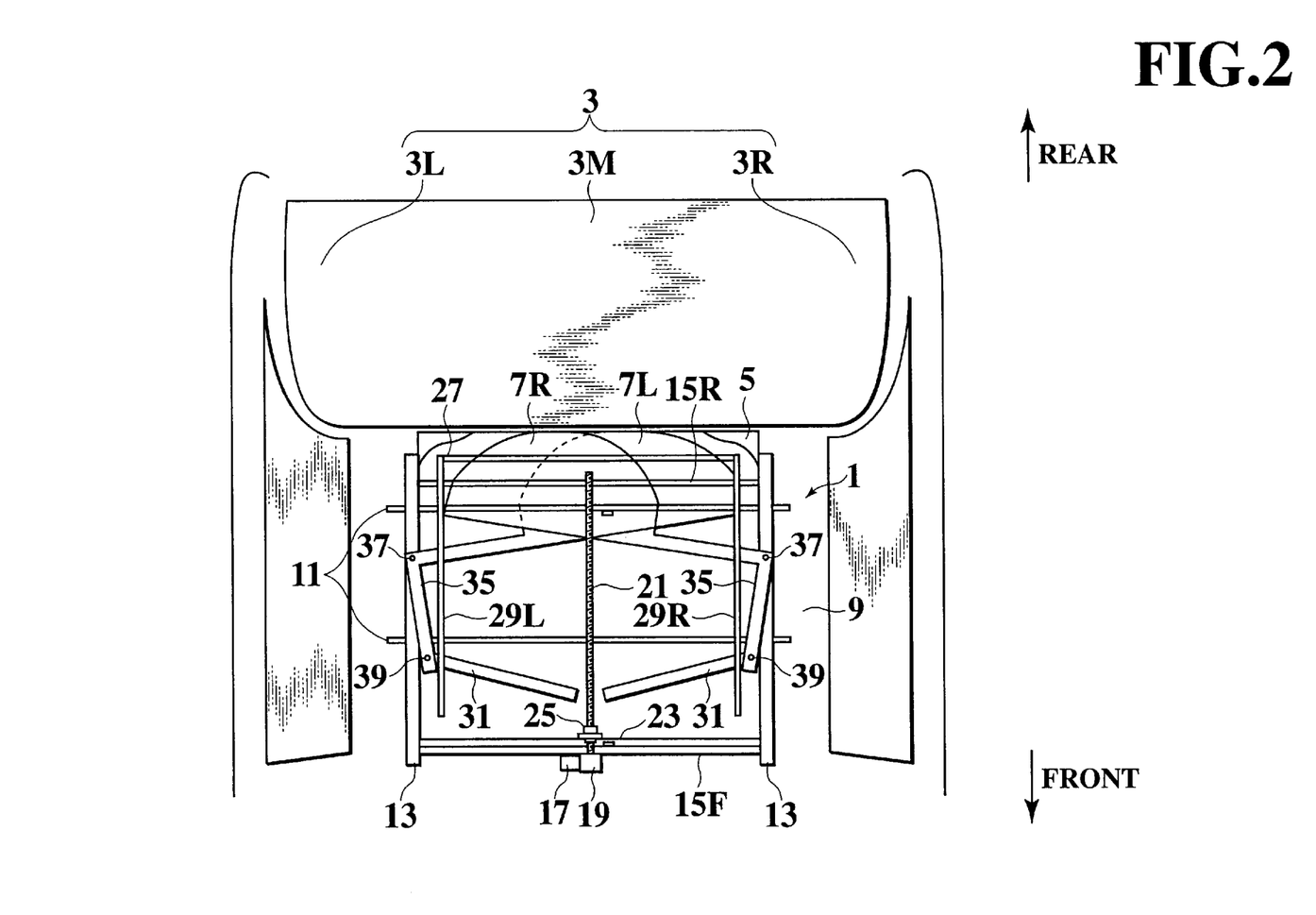
FIG. 2 is an explanatory diagram showing a state that a light shielding material of the light shielding apparatus for a rear window of an automobile according to the present invention is stored on an inner face of a roof of an automobile.

FIGS. 1 and 2 show a light shielding apparatus 1 for a rear window of an automobile according to the present invention. FIG. 1 shows a light shielded state, and FIG. 2 shows a non-light-shielding state, namely, a stored state.

The light shielding apparatus 1 for a rear window has a light shielding plate 5 as a main light shielding material for shielding a center section 3M of a rear window 3 from a light, and light shielding plates 7L and 7R as sub light shielding materials for shielding right and left (in FIG. 1) curved face sections 3L and 3R of the rear window 3 from a light.

Two slide rails 13 as a linear moving mechanism are attached to a roof inner face 9 of the automobile in a front-and-rear direction (up-and-down direction in FIG. 1) by means of two attachment shafts 11. Front ends (downward end sections in FIG. 1) of the slide rails 13 are connected by a front supporting member 15F, and rear ends (upward end sections in FIG. 1) are connected by a rear supporting member 15R. A drive motor 17 and a gear mechanism 19 as a light shielding material moving mechanism are provided at a center of the front supporting member 15F. The above arrangement of the drive motor 17 and the gear mechanism 19 as the light shielding material moving mechanism can be modified such that they are shifted or off-set from the center to another location. A screw member 21 is rotatably supported by the gear mechanism 19 which is mounted to the front supporting member 15F as shown in FIG. 2. A modification where the screw member 21 is rotatably supported by bearing means which is to be mounted to the front supporting member 15F can be made.

Figure 3:
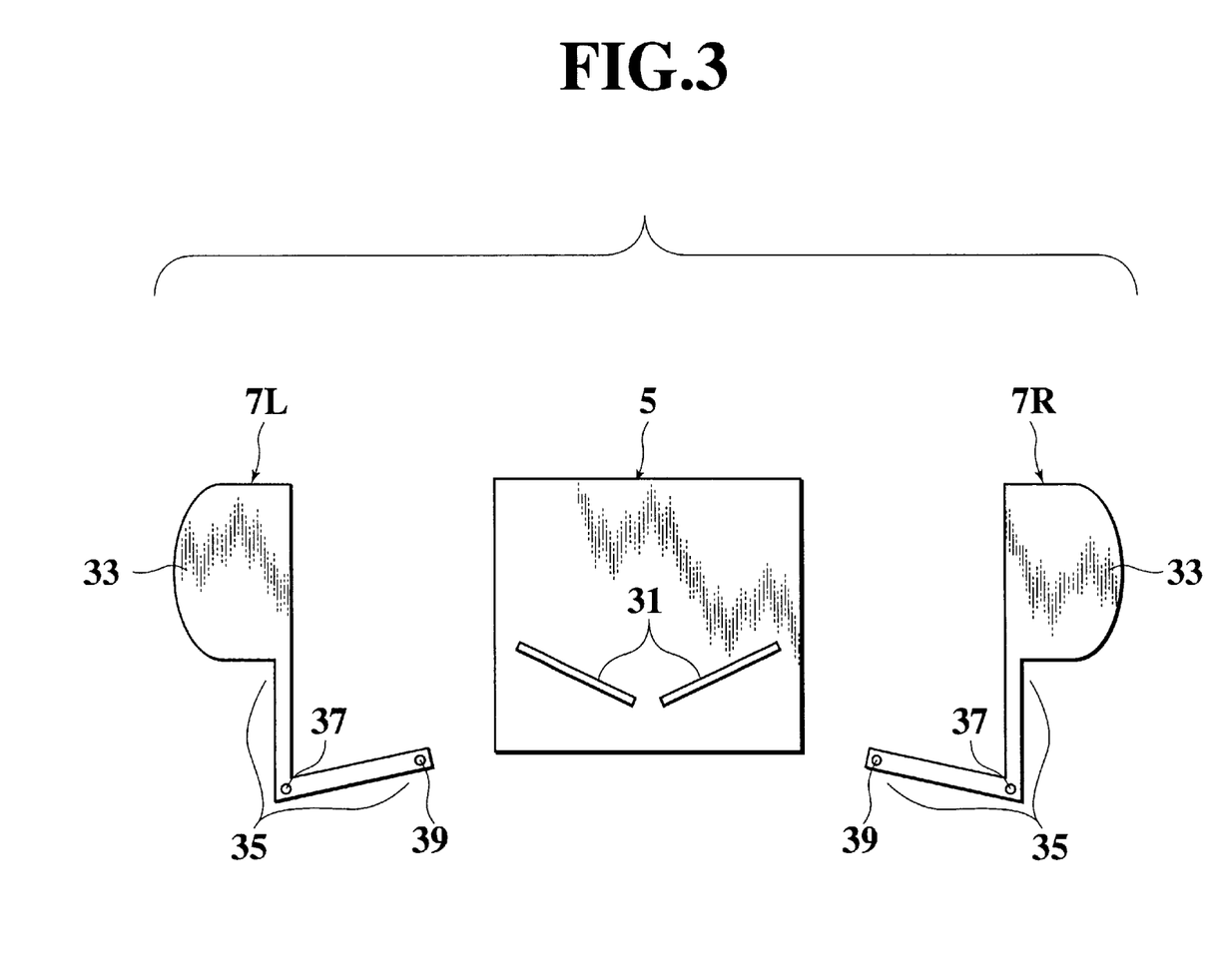
FIG. 3 is a plan view showing forms of a main light shielding material and a sub light shielding material.
Figure 4:
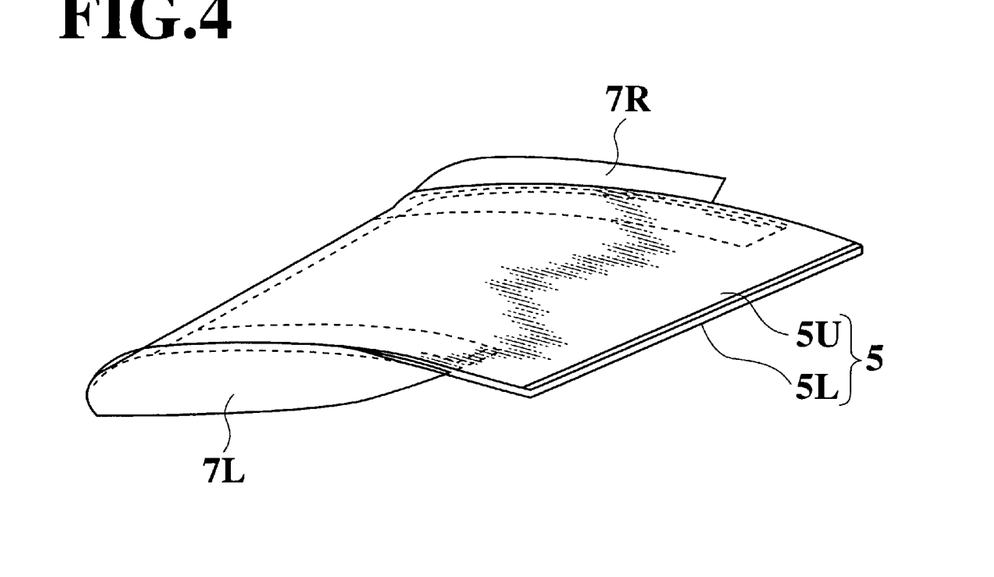
FIG. 4 is a perspective view showing a state of the sub light shielding material sandwiched or inserted into a plurality of main light shielding materials in a state of shielding a rear window from a light.
Figure 5:
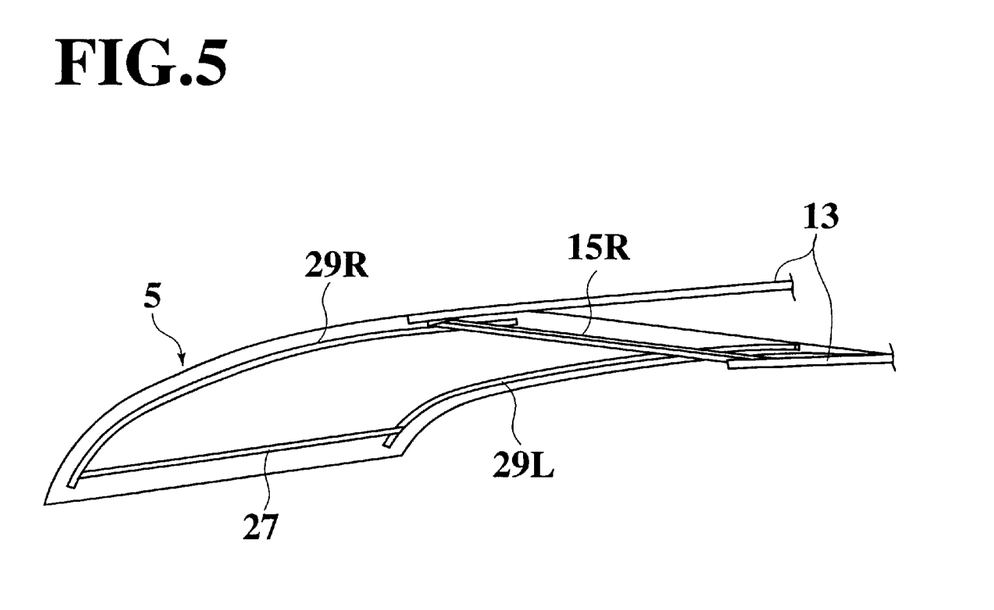
FIG. 5 is an explanatory diagram showing a framework which supports the main light shielding material.

With reference to FIGS. 3 and 4, the main light shielding plate 5 is composed of two upper and lower main light shielding plates 5U and 5L which have a rectangular shape. One of the upper and lower main light shielding plates 5U and 5L or both the main light shielding plates 5U and 5L have the light shielding function. As shown in FIG. 5, the upper and lower main light shielding plates 5U and 5L are sandwiched between the two slide rails 13 with a predetermined interval. The main light shielding plates 5U and 5L and the sub light shielding plates 7L and 7R may be composed of a light shielding curtain and a transparent plate for supporting the light shielding curtain respectively.

With reference to FIGS. 1 and 5, a frame material 23 is provided to the front end of the main light shielding plate 5, and a nut member 25 into which the screw member 21 is screwed is attached to the frame material 23. Moreover, a retaining member 27 is connected to a pair of right and left; fixing shafts 29L and 29R which are elastic members. The main light shielding plate 5 is fixed to the right and left fixing shafts 29L and 29R at front end portions of the fixing shafts 29L and 29R so that the main light shielding plate 5 is supported by the retaining member 27 and the right and left fixing shafts 29L and 29R in such a manner that reverse or under face of the main light shielding plate 5 is contact onto the retaining member 27 and the right and left fixing shafts 29L and 29R. A modification where the main light shielding plate 5 is fixed to the retaining member 27 and/or the right and left fixing shafts 29L and 29R at full length thereof, cabe made. Therefore, the main light shielding plate 5 is made to come closely into contact with the rear window 3 at the time of shielding a light.

In addition, sub light shielding material-use guides 31 as notches or guide members are provided to the lower main light shielding plate 5L so as to be symmetric with respect to a center line and so that inclination towards center comes to the front side.

With reference to FIGS. 1 and 5, a frame material 23 is provided to the front end of the main light shielding plate 5, and a nut member 25 into which the screw member 21 is screwed is attached to the frame material 23. Moreover, a retaining member 27 is connected to a pair of right and left fixing shafts 29L and 29R which are elastic members. The main light shielding plate 5 is fixed to the right and left fixing shafts 29L and 29R at front end portions of the fixing shafts 29L and 29R so that the main light shielding plate 5 is supported by the retaining member 27 and the right and left fixing shafts 29L and 29R in such a manner that reverse or under face of the main light shielding plate 5 is contact onto the retaining member 27 and the right and left fixing shafts 29L and 29R. A modification where the main light shielding plate 5 is fixed to the retaining member 27 and/or the right and left fixing shafts 29L and 29R at full length thereof, can be made. Therefore, the main light shielding plate 5 is made to come closely into contact with the rear window 3 at the time of shielding a light.

Therefore, when the main light shielding plate 5 moves to the front-and-rear direction, the sub light shielding material-use guides 31 also move to the front-and-rear direction. Accordingly, the sliders 39 move to the front-and-rear direction, and the right and left sub light shielding plates 7L and 7R swivel about the fulcrums 37. As a result, the sub light shielding plates 7L and 7R cover the curved face sections 3L and 3R of the rear window 3 or can be stored between the upper and lower main light shielding plates 5U and 5L.

There will be explained below an operation based on FIGS. 1 and 2. In the case where the rear window 3 is shielded from a light, the screw member 21 is rotated by the drive motor 17 via the gear mechanism 19, and the nut member 25 which is provided to the frame material 23 of the main light shielding plate 5 is moved rear. As a result, the main light shielding plate 5 is moved along the slide rails 13 to the center section 3M of the rear window 3. At this time, the main light shielding plate 5 is retained by the fixing shafts 29L and 29R and the retaining member 27, and the main light shielding plate 5 is made to come closely into contact with the rear window 3.

As the main light shielding plate 5 moves rear, the sliders 39 gradually move rear along the sub light shielding material-use guides 31 provided to the lower main light shielding plate 5L. As a result, the arm section 35 of the right sub light shielding plate 7R rotates to a clockwise direction about the fulcrum 37, and the sub light shielding portion 33 is pulled out of between the upper and lower main light shielding plates 5U and 5L so as to shield the right end section of the rear window 3 from a light.

At the same time, the arm section 35 of the left sub light shielding plate 7L rotates to a counterclockwise direction about the fulcrum 37, and the sub light shielding portion 33 of the left sub light shielding plate 7L is also pulled out of between the upper and lower main light shielding plates 5U and 5L. As a result, the left sub light shielding plate 7L shields the left end section of the rear window 3 from a light. In the shielded state, the right and left end sections of the main light shielding plate 5 are slightly overlapped with the end sections of the sub light shielding plates 7L and 7R.

Meanwhile, in the case where the main light shielding plate 5 and the sub light shielding plates 7L and 7R are stored, the drive motor 17 is rotated to a direction opposite to the light shielding operation, and the nut member 25 is moved to the front side so that the main light shielding plate 5 is stored on the inner face of the roof. At the same time, the arm sections 35 are rotated about the fulcrums 37 so that the light shielding portions 33 of the right and left sub light shielding plates 7L and 7R are stored between the main light shielding plates 5U and 5L.

Figure 6:
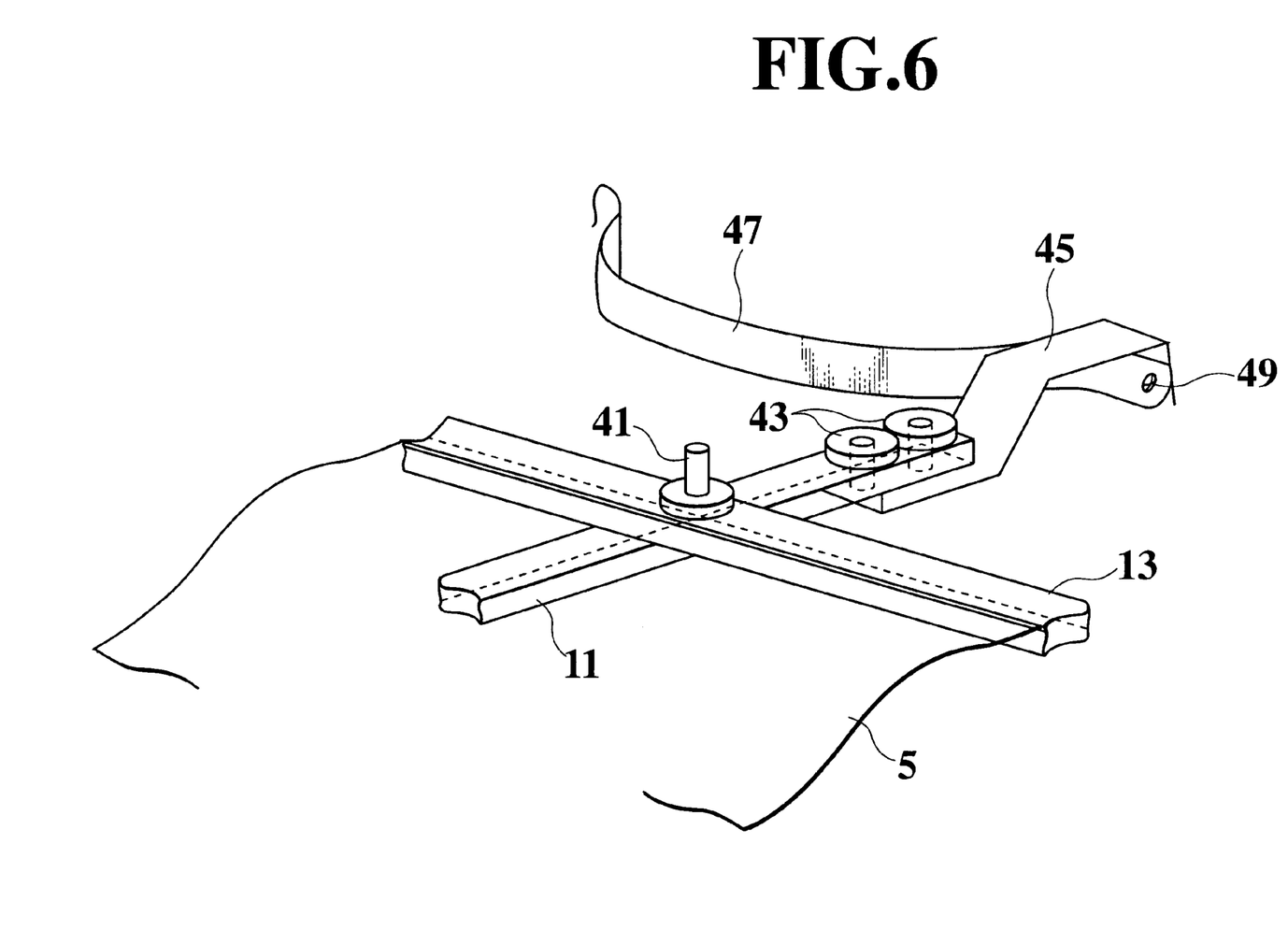
FIG. 6 is a perspective view showing a attaching section of the light shielding apparatus for a rear window of an automobile according to the present invention.

In addition, with reference to FIG. 6, in the case where the rear window light shielding apparatus 1 is attached to the roof inner face 9 of an automobile, the slide rails 13 are attached and fixed to the front and rear attachment shafts 11 by fixing screws 41. Moreover, the slide rails 13 are fixed to the right and left ends of the attachment shafts 11 (only the right end of the attachment shaft 11 on the front side is shown in FIG. 6) by attachment screws 49 of assist grips (hanger hooks) 47 attached to the rear section in the automobile via fixtures 45 attached by attachment screws 43. Since the rails are attached in such a manner, they can be post-attached.

Accordingly, the light shielding apparatus are stored in a small space, and this does not become an obstacle. In the case of the light shielding state, the whole face of the rear window 3 is covered with the main light shielding plate 5 and the two sub light shielding plates 7L and 7R. As a result, the right and left curved face sections of the rear window can be also shielded from light effectively. Further, the main light shielding plate 5 moves so that the sub light shielding plates 7L and 7R swivel and move. As a result, the apparatus is inexpensive and compact and can be post-attached. For this reason, the apparatus can cope with a automobile which have been already used.

Figure 7:
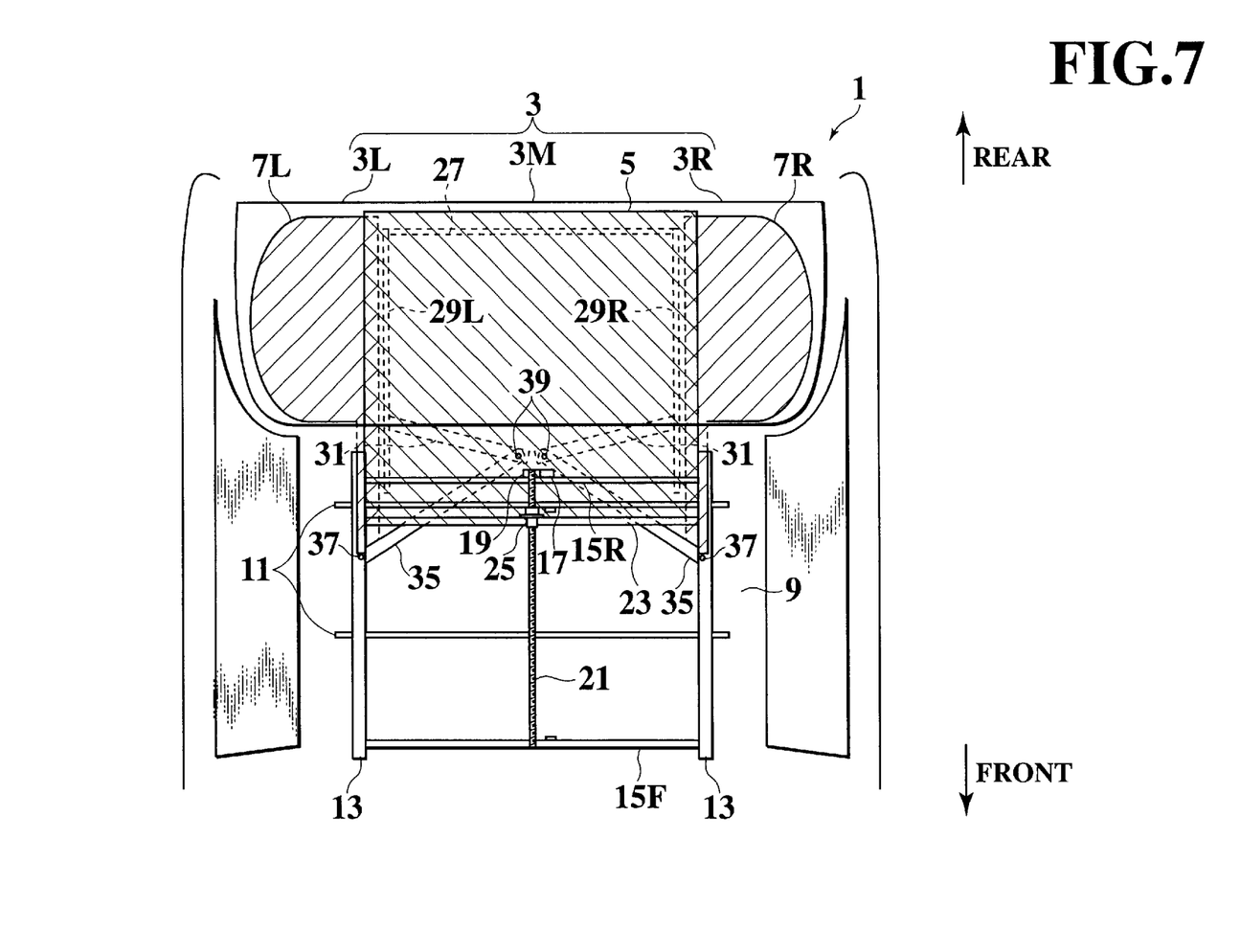
FIG. 7 is an explanatory diagram showing a light shielding apparatus for a rear window of an automobile according to another embodiment of the present invention.

The invention is not limited to the above embodiment, and various embodiments can be applied to the invention by suitable modifications. Namely, in the above embodiment, as shown in FIGS. 1 and 2, the drive motor 17 and the gear mechanism 19 which move the main light shielding plate 5 and the right and left sub light shielding plates 7L and 7R are attached to the front supporting member 15F provided to the front side. In addition to the embodiment, the drive motor 17 and the gear mechanism 19 may be attached to the rear supporting member 15R as shown in FIG. 7 or to one of rear end of the two attachment shafts 11.

The entire contents of Japanese Patent Application P11-224301 (filed Aug. 6, 1999) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A light shielding apparatus for a rear window of an automobile which covers an inside of the rear window of the automobile so as to shield a rear side from a light, comprising:

a main light shielding material for shielding a center section of the rear window from a light;

a right and a left sub light shielding materials for shielding right and left curved face sections of the rear window from a light; and a light shielding material moving mechanism for moving the main light shielding material and the right and the left sub light shielding materials to a light shielded state or a stored state, wherein the main light shielding material is composed of an upper and a lower light shielding materials which are approximately rectangular-shaped flexible materials including plates or curtains wherein at least one of the upper and a lower light shielding materials has a light shielding function;

the right and the left sub light shielding materials are composed of a plurality of plates or curtains at least one of which has a light shielding function; and each of the right and the left sub light shielding materials includes:

a light shielding portion which can be curved and is sandwiched between the upper and the lower light shielding materials for shielding the rear window from a light; and an arm section which supports the light shielding portion and is bent at a predetermined angle.

2. A light shielding apparatus for a rear window of an automobile according to claim 1, wherein the light shielding material moving mechanism includes a drive motor and a linear moving mechanism which integrally move the upper and the lower light shielding materials to a front-and-rear direction; and the light shielding material moving mechanism further includes a swivel moving mechanism which swivels and moves the light shielding portions of the sub light shielding materials to a light shielded position and to a storage position.

3. A light shielding apparatus for a rear window of an automobile according to claim 2, wherein the swivel moving mechanism moves end points of the arm sections of the sub light shielding materials along guide members provided to the main light shielding material according to the front and rear movement of the main light shielding material;

thereby the light shielding portions of the sub light shielding materials are swiveled about fulcrums provided to bent sections of the arm sections of the sub light shielding materials.

4. A light shielding apparatus for a rear window of an automobile according to claim 3, wherein the linear moving mechanism includes:

slide rails which guide the main light shielding material so as to be movable to the front-and-rear direction; and attachment shafts which can be post-attached to an assist grip previously mounted into the automobile, the attachment shafts are respectively provided with the slide rails at both ends of the attachment shafts.

5. A light shielding apparatus for a rear window of an automobile according to claim 4, further comprising:

elastic fixing shafts which support the main light shielding material from its lower side in order to make the main light shielding material come closely into contact with the rear window at the time of the light shielding.

* * * * *